(12) United States Patent
Louh

(10) Patent No.: US 8,246,257 B2
(45) Date of Patent: Aug. 21, 2012

(54) OPTICAL FIBER CONNECTOR

(75) Inventor: Sei-Ping Louh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 206 days.

(21) Appl. No.: 12/732,216

(22) Filed: Mar. 26, 2010

(65) Prior Publication Data
US 2011/0135256 A1 Jun. 9, 2011

(30) Foreign Application Priority Data
Dec. 7, 2009 (CN) .......................... 2009 1 0311015

(51) Int. Cl.
*G02B 6/36* (2006.01)
(52) U.S. Cl. ............................................ 385/93; 84/724
(58) Field of Classification Search .................. 385/93
See application file for complete search history.

(56) References Cited

U.S. PATENT DOCUMENTS

| | | | | |
|---|---|---|---|---|
| 4,087,155 A | * | 5/1978 | Deacon | 385/82 |
| 4,223,976 A | * | 9/1980 | Zangiacomi et al. | 385/64 |
| 4,391,487 A | * | 7/1983 | Melman et al. | 385/82 |
| 4,406,515 A | * | 9/1983 | Roberts | 385/72 |
| 4,421,383 A | * | 12/1983 | Carlsen | 385/79 |
| 4,530,566 A | * | 7/1985 | Smith et al. | 385/51 |
| 4,691,985 A | * | 9/1987 | Shank et al. | 385/84 |
| 4,736,662 A | * | 4/1988 | Yamamoto | 84/724 |
| 5,185,836 A | * | 2/1993 | Baker | 385/61 |
| 5,274,723 A | * | 12/1993 | Komatsu | 385/92 |
| 5,751,876 A | * | 5/1998 | Ikesugi et al. | 385/86 |
| 6,174,091 B1 | * | 1/2001 | Herrmann | 385/81 |
| 6,257,770 B1 | * | 7/2001 | Sato | 385/78 |
| 6,328,482 B1 | * | 12/2001 | Jian | 385/88 |
| 6,536,956 B2 | * | 3/2003 | Luther et al. | 385/86 |
| 6,597,713 B2 | * | 7/2003 | Ouchi | 372/36 |
| 6,629,781 B2 | * | 10/2003 | Shigenaga et al. | 385/78 |
| 2001/0053266 A1 | * | 12/2001 | Suematsu et al. | 385/80 |
| 2004/0109646 A1 | * | 6/2004 | Anderson et al. | 385/71 |
| 2005/0196108 A1 | * | 9/2005 | Brown | 385/88 |
| 2009/0087151 A1 | * | 4/2009 | Benjamin et al. | 385/98 |

* cited by examiner

*Primary Examiner* — Charlie Peng
*Assistant Examiner* — Peter Radkowski
(74) *Attorney, Agent, or Firm* — Altis Law Group, Inc.

(57) ABSTRACT

An optical fiber connector includes a housing, a plurality of lenses fixed to the housing, a plurality of optical fibers, and a glue. The housing defines a plurality of blind holes and receiving cavities. Each blind hole includes a first receiving hole portion. Each receiving cavity is in communication with the corresponding first receiving hole portion. Each optical fiber is received in the corresponding blind hole and includes a core portion. The glue is applied in each receiving cavity and fixes the optical fibers in the housing. Along a lengthwise direction of each blind hole, a projection of each receiving cavity on a plane perpendicular to the lengthwise direction covers that of the core portion. The glue surrounds the core portion, and a distal end of the core portion contacts an inner surface of the housing in the corresponding receiving cavity facing the respective blind hole.

11 Claims, 4 Drawing Sheets

OPTICAL FIBER CONNECTOR

BACKGROUND

1. Technical Field

The present disclosure relates to optics and, particularly, to an optical fiber connector.

2. Description of Related Art

Currently, optical fiber connectors are preferred for use in data transmission between electronic devices due to their high transmission speed and signal integrity. Generally, an optical fiber connector defines a plurality of blind holes for exactly receiving optical fibers and includes lenses corresponding to the optical fibers. When the optical fiber connector is assembled, each optical fiber is inserted into a corresponding blind hole and fixed in a predetermined position by glue in front of a corresponding lens. The material and refractive index of the glue matches that of the lenses and the optical fiber.

However, the glue is accumulated between the lenses and the optical fibers as the optical fibers fit the blind holes. Optical signals generated by the optical fibers have to pass through the glue and then enter into the lenses. If the glue produces a bubble when in assembly, the refractive index of the glue will be changed. As a result, the transmission accuracy and transmission efficiency of the optical fiber connector decreases.

Therefore, what is needed is to provide an optical fiber connector, which can overcome the above-mentioned problems.

BRIEF DESCRIPTION OF THE DRAWINGS

Many aspects of the present optical fiber connector can be better understood with reference to the following drawings. The components in the drawings are not necessarily to scale, the emphasis instead being placed upon clearly illustrating the principles of the optical fiber connector. Moreover, in the drawings, like reference numerals designate corresponding parts throughout the several views.

DETAILED DESCRIPTION

Figure 1:
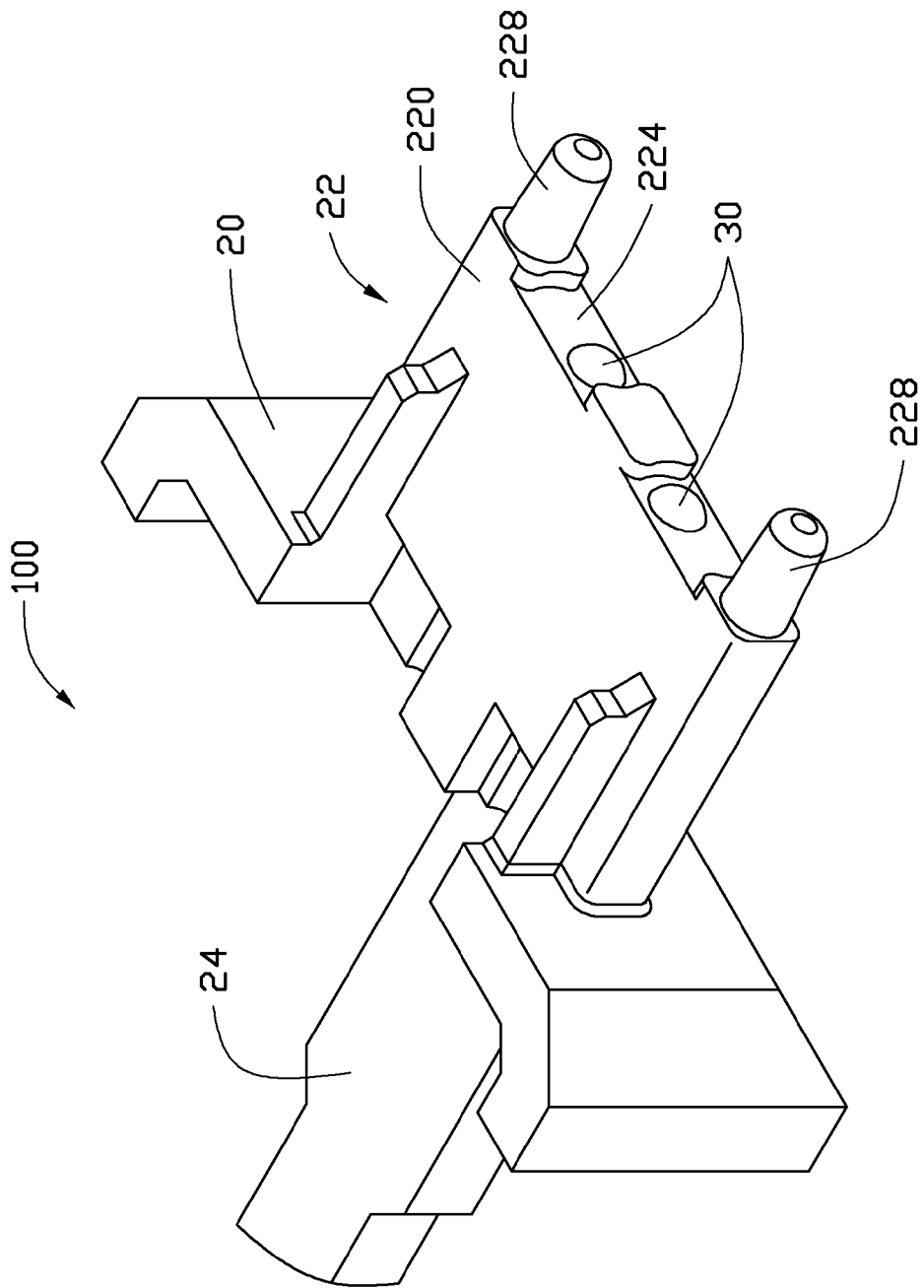
FIG. 1 is an isometric view of an optical fiber connector, according to a first exemplary embodiment.
Figure 2:
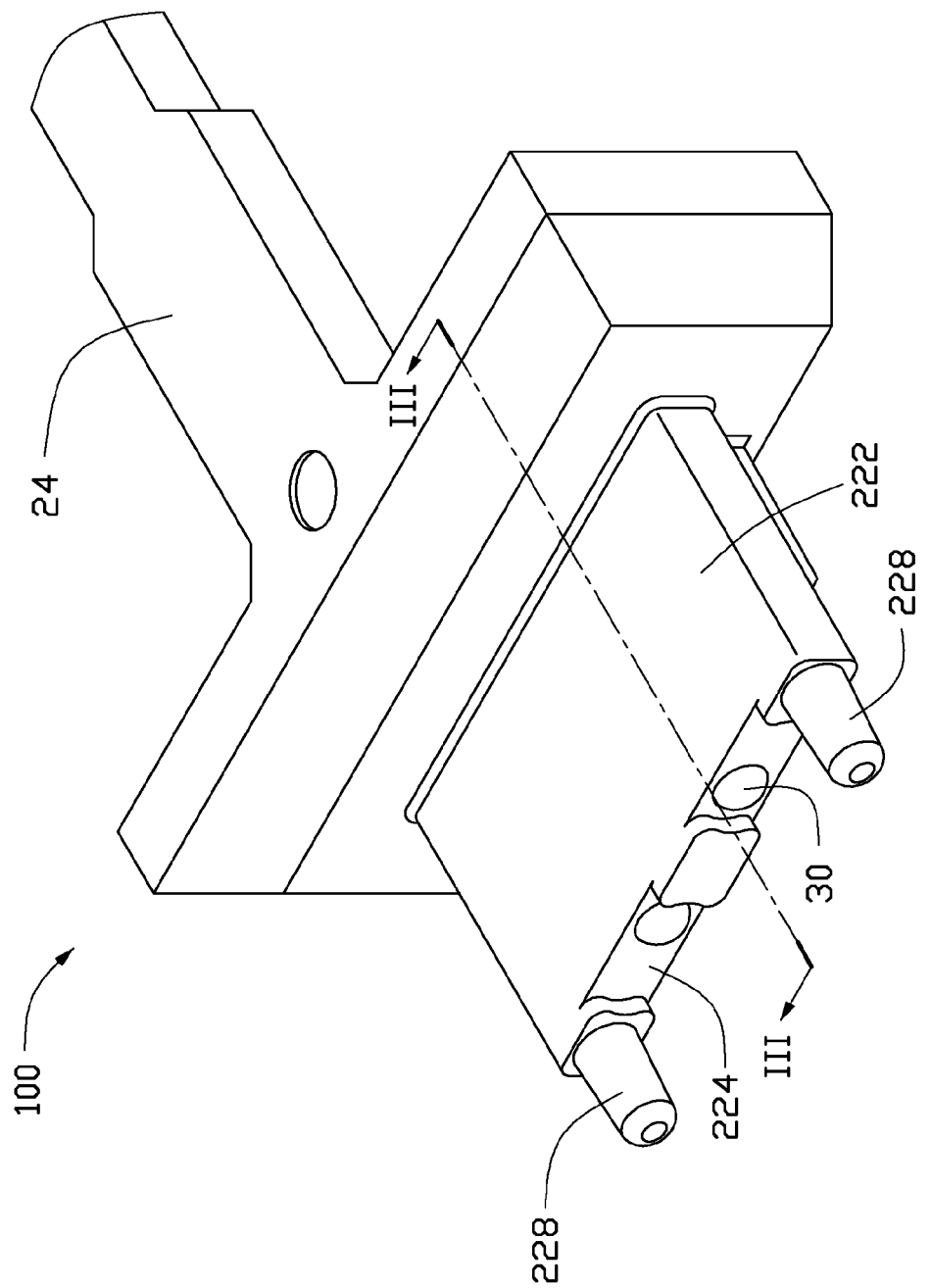
FIG. 2 is similar to FIG. 1, but viewing the optical fiber connector from another angle.
Figure 3:
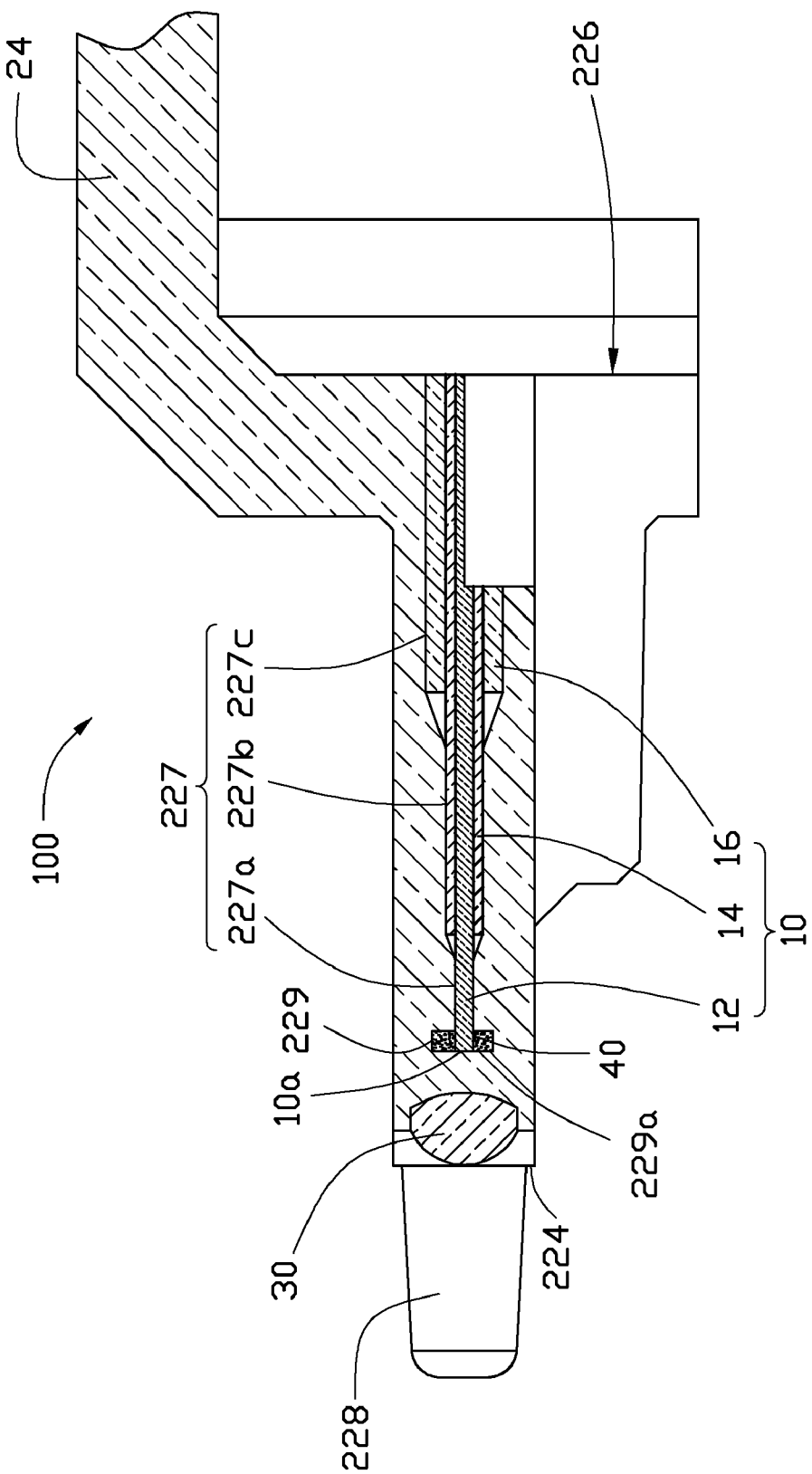
FIG. 3 is a cross sectional view taken along line III-III of the optical fiber connector of FIG. 2.

Referring to FIGS. 1-3, an optical fiber connector 100, according to a first exemplary embodiment, is used to electrically connect electronic devices, such as computer, printer, or camera, and transmits data to the electronic devices as an input terminal or an output terminal.

The optical fiber connector 100 includes two optical fibers 10, a housing 20, two lenses 30 fixed to the housing 20, and a glue 40 fixing each optical fiber 10 in the housing 20 at a predetermined position in front of a corresponding lens 30.

Each optical fiber 10 includes a core portion 12, a cladding layer 14 wrapping around the core portion 12, and a polymer layer 16 wrapping around the cladding layer 14. The core portion 12 is configured for transmitting optical signals. The core portion 12 has an exposed part at a distal end thereof. The cladding layer 14 has an exposed part proximate to the exposed part of the core portion 12.

The housing 20 includes a body 22 and an arm 24 extending from the body 22.

The body 22 is an approximately and includes a first surface 220, a second surface 222, a third surface 224, a fourth surface 226, and two plugs 228. The first surface 220 is parallel to the second surface 222. The third surface 224 is parallel to the fourth surface 226. The third surface 224 connects the first surface 220 to the second surface 222. The fourth surface 226 connects the first surface 220 to the second surface 222. The plugs 228 extend from the third surface 224 away from the fourth surface 226. The plugs 228 are configured for engaging with sockets of electronic devices so that the optical fiber connector 100 is electrically connected to the electronic devices.

Two blind holes 227 and two receiving cavities 229 are defined in the body 22 from the fourth surface 226 towards the third surface 224 (only one blind hold 227 and one receiving cavity 229 are illustrated in FIG. 3). Each optical fiber 10 is received in a corresponding blind hole 227 in front of the corresponding lens 30. Each blind hole 227 includes a first receiving hole portion 227a, a second receiving hole portion 227b, and a third receiving hole portion 227c connecting end to end in corresponding order away from the receiving cavity 229, along a direction where the optical fibers 10 are inserted into the blind holes 227. The diameters of the third receiving hole portion 227c, the second receiving hole portion 227b, and the first receiving hole portion 227a gradually decrease. The first receiving hole portion 227a receivingly engages with the exposed part of the core portion 12 of the respective optical fiber 10. The second receiving hole portion 227b receivingly engages with the exposed part of the cladding layer 14 of the respective optical fiber 10. The polymer layer 16 is received in the third receiving hole portion 227c.

The receiving cavities 229 are arranged between the respective lenses 30 and the blind holes 227. Each receiving cavity 229 is proximate to and in communication with the corresponding first receiving hole portion 227a. The housing 20 includes an inner surface 229a in each receiving cavity 229 facing the respective blind hole 227. Along a lengthwise direction of each blind hole 227 (the insertion direction of the optical fiber 10), a projection of each receiving cavity 229 on a plane perpendicular to the lengthwise direction covers that of the core portion 12. The distal end 10a of the exposed part of the core portion 12 of each optical fiber 10 abuts against the corresponding inner surface 229a. In this embodiment, each receiving cavity 229 has a rectangular cross section perpendicular to the lengthwise direction of the corresponding blind hole 227. In particular, the receiving cavity 229 is a round hole, corresponding to the first receiving hole portion 227a. The diameter of the receiving cavity 229 is larger than that of the first receiving hole portion 227a. In other embodiments, the receiving cavity 229 may be a square cutout.

The glue 40 is applied in each of the receiving cavities 229 and surrounds the exposed part of the core portion 12 of each optical fiber 10 to fix the optical fibers 10 in the housing 20.

The arm 24 is configured for being held when the optical fibers 10 are inserted into the blind holes 227, or when the optical fiber connector 100 is electrically connected to the electronic devices.

The lenses 30 are fixed on the third surface 224 in front of the optical fibers 10. The lenses 30 are configured for guiding the optical signals. When the optical fiber connector 100 is used as the output terminal, the lenses 30 are used to collimate the optical signals from the optical fibers 10. When the optical fiber connector 100 is used as the input terminal, the lenses 30 are used to focus the optical signals into the optical fibers 10.

When the optical fiber 10 is inserted into the corresponding blind hole 227, the core portion 12 presses the glue 40 received in the receiving cavity 229 until the distal end 10a of the core portion 12 contacts the inner surface 229a of the receiving cavity 229. The glue 40 surrounds the core portion 12 so that the optical fiber 10 is fixed in the blind hole 227. In other words, the glue 40 is expelled between the lenses 30 and the optical fibers 10. The optical signals from the optical fibers 10 can enter into the lenses 30 without passing though the glue 40. This increases the transmission accuracy and transmission efficiency of the optical fiber connector 100.

Figure 4:
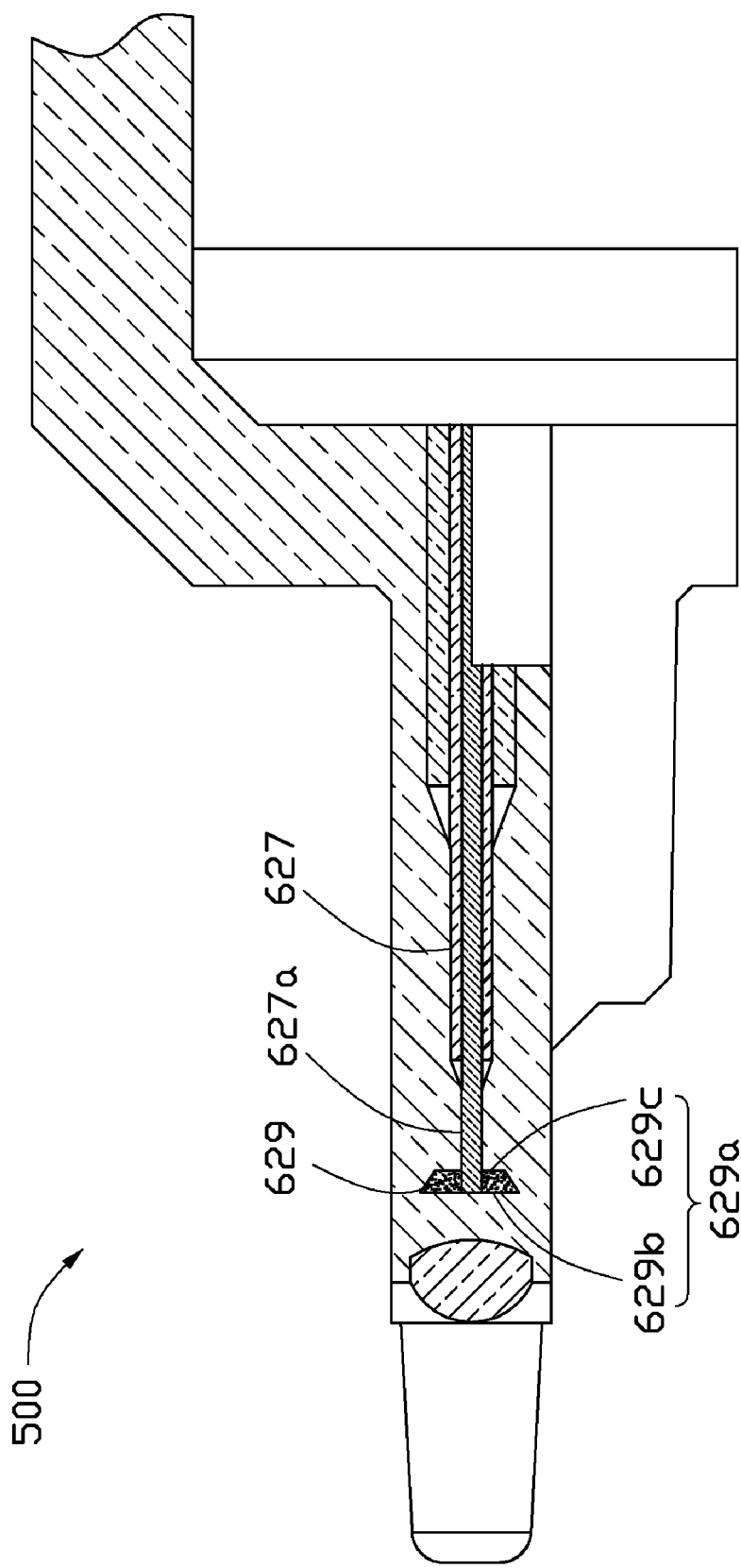
FIG. 4 is a cross sectional view of an optical fiber connector, according to a second exemplary embodiment.

Referring to FIG. 4, an optical fiber connector 500, according to a second exemplary embodiment, is shown. The difference between the optical fiber connector 500 of this embodiment and the optical fiber connector 100 of the first embodiment is that: each receiving cavity 629 has a trapezoidal cross section 629a along the lengthwise direction of the corresponding blind hole 627. The trapezoidal cross section 629a has a first edge 629b and a second edge 629c perpendicular to the lengthwise direction of the corresponding blind hole 627. The first edge 629b is adjacent to the lens 30 with respect to the second edge 629c. The length of the first edge 629b is larger than the length of the second edge 629c. In particular, the first receiving hole portion 627a is a round hole, and the receiving cavity 629 is a tapered hole.

Advantages of the optical fiber connector 500 of the second embodiment are similar to those of the optical fiber connector 100 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An optical fiber connector, comprising:
a housing comprising:
   a body having a first surface, a second surface parallel to the first surface, a third surface, and a fourth surface parallel to the third surface, both the third surface and the fourth surface connecting the first surface and the second surface, wherein a plurality of blind holes and receiving cavities are defined in the body from the fourth surface towards the third surface, each receiving cavity is adjacent to the third surface with respect to a corresponding one of the blind holes, each blind hole passes through the fourth surface, and has a first receiving hole portion communicated with the corresponding receiving cavity, the body is integrally formed;
   a plurality of lenses fixed on the third surface;
a plurality of optical fibers each received in the corresponding blind hole, each optical fiber comprising a core portion received in the first receiving hole portion of the corresponding blind hole; and
a glue applied in each receiving cavity and fixing the optical fibers in the housing;
wherein along a lengthwise direction of each blind hole, a projection of each receiving cavity on a plane perpendicular to the lengthwise direction covers that of the first receiving hole portion, the glue surrounds the core portion, and a distal end of the core portion contacts an inner surface of the housing in the corresponding receiving cavity facing the respective blind hole.

2. The optical fiber connector as claimed in claim 1, wherein the housing further comprises an arm extending from the fourth surface.

3. The optical fiber connector as claimed in claim 1, wherein each receiving cavity has a rectangular cross section along the lengthwise direction of the corresponding blind hole.

4. The optical fiber connector as claimed in claim 1, wherein each receiving cavity has a trapezoidal cross section along the lengthwise direction of the corresponding blind hole, the trapezoidal cross section has a first edge and a second edge perpendicular to the lengthwise direction of the corresponding blind hole, the first edge is adjacent to the lens with respect to the second edge, the length of the first edge is larger than the length of the second edge.

5. The optical fiber connector as claimed in claim 1, wherein each optical fiber comprises a cladding layer wrapping around the core portion, and a polymer layer wrapping around the cladding layer; each blind hole comprises a second receiving hole portion and a third receiving hole portion proximate to the first receiving hole portion, the cladding layer is received in the second receiving hole portion; and the polymer layer is received in the third receiving hole portion.

6. The optical fiber connector as claimed in claim 1, wherein the body further comprises at least one plug extending from the third surface away from the fourth surface.

7. An optical fiber connector, comprising:
a plurality of optical fibers, each optical fiber comprising a core portion, a cladding layer surrounding the core portion, and a polymer layer surrounding the cladding layer, the core portion of each optical fiber having an exposed part at a distal end thereof, the cladding layer of each optical fiber having an exposed part proximate to the exposed part of the core portion;
a plurality of lenses each having an optical axis associated therewith;
a housing comprising:
   a body having a first surface, a second surface parallel to the first surface, a third surface, and a fourth surface parallel to the third surface, both the third surface and the fourth surface connecting the first surface and the second surface, wherein a plurality of blind holes and receiving cavities are defined in the body, each receiving cavity is adjacent to the third surface with respect to a corresponding one of the blind holes, each blind hole passes through the fourth surface, and has a first receiving hole portion communicated with the corresponding receiving cavity, the body is integrally formed; the lenses are mounted on the third surface, the blind holes pass through the fourth surface towards the third surface and extend along the respective optical axis, each blind hole comprises a first receiving hole portion receivingly engaged with the exposed part of the core portion of the respective optical fiber, a second receiving hole portion receivingly engaged with the exposed part of the cladding layer of the respective optical fiber, the receiving cavities are arranged between the respective lenses and the blind holes, each receiving cavity is proximate to and in communication with the corresponding first receiving hole portion, along a lengthwise direction of each blind hole, a projection of each receiving cavity on a plane perpendicular to the lengthwise direction covers that of the first receiving hole portion, the housing comprises an inner surface in each receiving cavity facing the respective blind hole, the distal end of the exposed part of the core portion of each optical fiber abutting against the corresponding inner surface; and a glue applied in each of the receiving cavities and surrounding the exposed part of the core portion of each optical fiber to fix the optical fibers in the housing.

8. The optical fiber connector as claimed in claim 7, wherein the housing further comprises an arm extending from the fourth surface.

9. The optical fiber connector as claimed in claim 7, wherein each receiving cavity has a rectangular cross section along the lengthwise direction of the corresponding blind hole.

10. The optical fiber connector as claimed in claim 7, wherein each receiving cavity has a trapezoidal cross section along the lengthwise direction of the corresponding blind hole, the trapezoidal cross section has a first edge and a second edge perpendicular to the lengthwise direction of the corresponding blind hole, the first edge is adjacent to the lens with respect to the second edge, the length of the first edge is larger than the length of the second edge.

11. The optical fiber connector as claimed in claim 7, wherein the body further comprises at least one plug extending from the third surface away from the fourth surface.

* * * * *